United States Patent [19]

Greiner et al.

[11] Patent Number: 4,958,353
[45] Date of Patent: Sep. 18, 1990

[54] DEVICE FOR CALCULATING THE PARITY BITS OF A SUM OF TWO NUMBERS

[75] Inventors: Alain Greiner, Paris; Xiaowei Sun, Pantin; Michel Thill, Les Clayes-Sous-Bois, all of France

[73] Assignee: Bull S.A., Paris, France

[21] Appl. No.: 311,736

[22] Filed: Feb. 17, 1989

[30] Foreign Application Priority Data

Feb. 18, 1988 [FR] France ............................. 88 01910

[51] Int. Cl.⁵ ............................................. G06F 11/10
[52] U.S. Cl. ................................. 371/49.4; 364/738
[58] Field of Search ...................... 364/738; 371/49.4

[56] References Cited

U.S. PATENT DOCUMENTS 3,925,647  12/1975  Louie .................................. 364/738

OTHER PUBLICATIONS

Fujiwara, E. et al., "Fault-Tolerant Arithmetic Logic Unit Using Parity-Based Codes", Trans. IECE Japan, vol. 64E, No. 10, Oct. 1981, pp. 653–660.

Primary Examiner—Jerry Smith
Assistant Examiner—Stephen M. Baker
Attorney, Agent, or Firm—Kerkam, Stowell, Kondracki & Clarke

[57] ABSTRACT

A system as proposed for calculating the parity bits (PS) of a sum (S) of two numbers (A, B). One parity bit (PA, PB, PS) is associated with each group of m bits ($a_i$, $b_i$, $s_i$) extracted from the numbers (A, B) and the sum (S). For each group, one system for calculating the parity bit (PC) associated with the corresponding group extracted from the carry word formed at the time of the addition is provided. This system includes the following:

a first stage (11) for calculating, for every i included between 1 and m−1, the values:

$$p_i = a_i \oplus b_i$$

$$g_i = a_i \cdot b_i$$

where $\oplus$ indicates the EXCLUSIVE OR operation.

a first operator (41a) for calculating, for every i included between 1 and m−1, the values $P_i$ and the values $G_i$ verifying the following recurring logical equations:

$$P_i = p_i \cdot P_{i-1}, \text{ with } P_1 = p_1$$

$$G_i = g_i + p_i \cdot G_{i-1}, \text{ with } G_1 = g_1$$

a second operator (41b) for calculating the following:

$$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

and a third operator (51) for calculating:

$$PC = Y \oplus c_{in} \cdot X^*$$

where $c_{in}$ is the least significant carry bit of the group, and where $X^*$ is the complement of X. The invention is used in particular in arithmetical and logical units of computers.

21 Claims, 6 Drawing Sheets

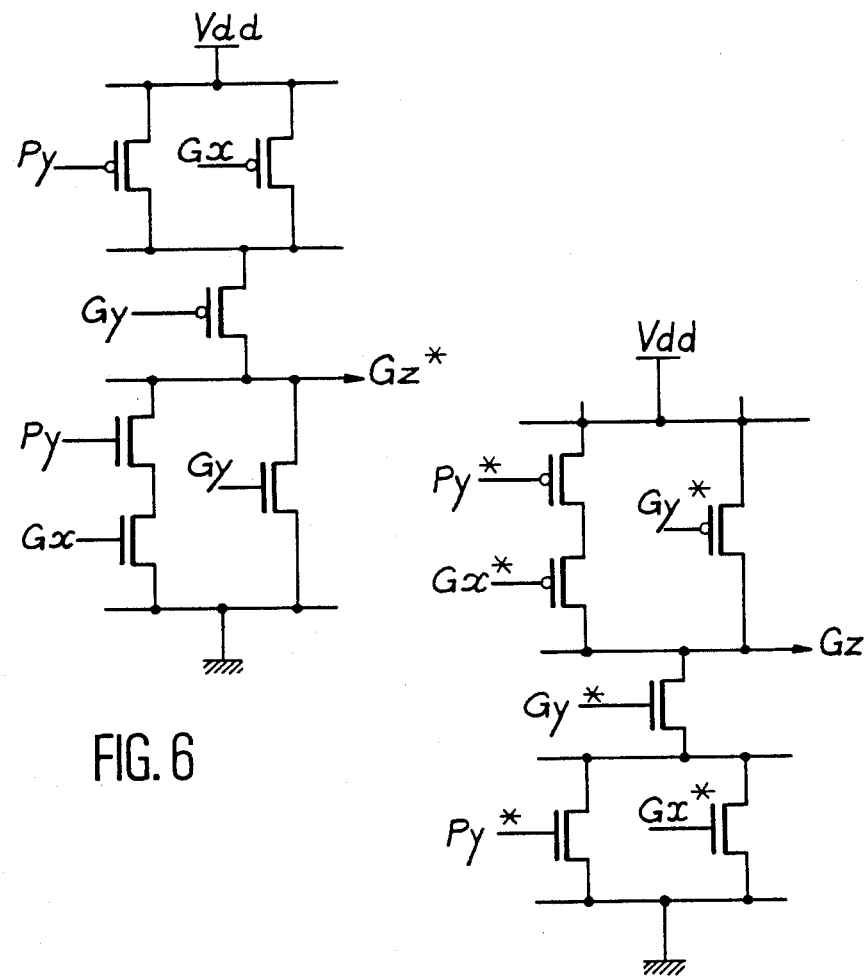
FIG. 6
FIG. 7
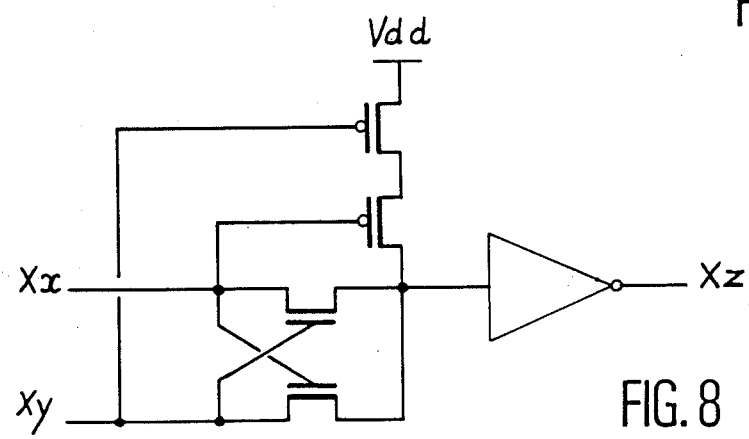
FIG. 8

DEVICE FOR CALCULATING THE PARITY BITS OF A SUM OF TWO NUMBERS

FIELD OF THE INVENTION

The invention relates to the field of adders used particularly in computer processors.

More particularly, the invention relates to circuits for calculating the parity bits associated with the binary number that is the result of an addition calculated by an adder that receives two binary numbers at its input.

BACKGROUND OF THE INVENTION

Generally, the parity bits associated with words or binary numbers are used to be able to detect whether these words or numbers are not in error after having been manipulated in the processing circuit.

The parity bit of a group of bits is conventionally defined as the result of the combination by EXCLUSIVE OR operations bearing on the set of bits comprising the group. The parity bit thus assumes a value 1 if the number of "1"'s contained in the group is odd. Thus when a single bit or an odd number of bits of the group are in error, the parity bit assumes the complementary value to the value that it should have. The errors can then be detected by simple comparison between the real parity calculated from the group and the expected parity corresponding to the value of the parity bit. Moreover, the words can be formed of a plurality of groups of bits, and one parity bit can be assigned to each group. A word can then be associated with more than one parity bit.

When operations bearing on one or more words are performed, it is suitable for the result of this operation also to be associated with one or more parity bits. This is true in particular for addition operations.

The parity bit or bits of the result of an addition may be calculated directly from the result. Nevertheless, if this is done, the parity bits of the result cannot be obtained except after the result itself, which postpones the moment when the result and its associated parity bits can be used in the course of processing.

Additionally, it is desirable for the parity bits to be capable of being calculated independently of the result per se, because this also provides a check of the accuracy of the addition.

The problem of predicting the parity bits of a sum is addressed in many articles that offer solutions in particular cases. This state of the art is for example illustrated by the IBM Technical Disclosure Bulletin, Vol. 23, No. 12, May 1981, pp. 5498–5502.

Nevertheless, when the words for which the parity bit or bits that one wishes to calculate include a large number of bits, none of the known systems enable rapid calculation in all cases.

OBJECT AND SUMMARY OF THE INVENTION

The object of the invention is to permit calculation of the parity bits of a sum of two numbers in the shortest possible time. The importance of rapid calculation of the parity bits resides in the fact that this calculation does not postpone the moment when the adder becomes available once again for the ensuing operation. The result is that the calculating unit can operate at a higher frequency.

It will be seen hereinafter that the rapidity of the calculation of the parity bits of a sum is conditional upon the rapidity of calculation of the parity bits associated with the word formed by the carry bits appearing in the course of the addition. This word will hereinafter be called the "carry word".

When the numbers to be added include a large number of bits, it is more advantageous to consider this word as the concatenation of several groups of bits and to assign one parity bit to each of these groups. For example, eight parity bits can be assigned to a 64-bit word, each parity bit being associated with one group of eight bits of the word. This method makes it possible in particular to improve error detection, especially in the case of multiple errors bearing on different groups.

By definition, the parity bit associated with one group extracted from the carry word depends in principle on all the carry bits formed at the time of the addition.

The problem of calculating the carry bits has already been posed in order to make the adders. It has proved that the greater its significance, the later a carry bit is obtained. Accordingly, in the adders, the attempt is made to provide carry bits anticipation circuits, usually called "carry lookahead, to calculate these carry bits as fast as possible.

However, even by using high-powered circuits, the most significant carry bits are always obtained almost at the end of the addition operation.

Thus the invention relates to a solution for calculating the parity bits associated with the groups forming the carry word according to which, once the calculation of the carry bits has been performed, the time subsequently necessary for calculating the parity bits is reduced to the maximum. This result is made possible by the fact that the system according to the invention performs the calculation in two steps:

a first step which uses as its input variables variables that depend uniquely on the numbers to be added; and a second rapid step that introduces carry bits.

The first step takes place during the calculation of carry bits by the anticipation circuit of the adder and, considering the relative slowness of this calculation, this first step is designed so as to perform the maximum number of preparatory calculations, thus making it possible to simplify the second step which is consequently made faster.

More precisely, the subject of the invention is a system for calculating the parity bit associated with at least one group of m consecutive bits extracted from the carry word appearing upon the addition of two binary numbers, where these numbers each including at least one group of m bits, the groups belonging respectively to the numbers and to the carry word comprising respective bits of the same significance, and the extracted groups of the numbers are formed respectively by bits $a_m, \ldots, a_i, \ldots, a_2, a_1$ and bits $b_m, \ldots, b_i, \ldots, b_2, b_1$, and the subscript i indicating the significance in the group of the associated bit, the system being characterized in that it includes:

a first stage for calculating, for every i included between 1 and m−1, the values:

$$p_i = a_i \oplus b_i$$

$$g_i = a_i \cdot b_i$$

where ⊕ indicates the EXCLUSIVE OR operation;

a first operator for calculating, for every i included between 1 and m−1, the values $P_i$ and the values $G_i$ verifying the following recurring logical equations:

$$P_i = p_i \cdot P_{i-1}, \text{ with } P_1 = p_1$$

$$G_i = g_i + p_i \cdot G_{i-1}, \text{ with } G_1 = g_1$$

a second operator for calculating the following:

$$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

and a third operator for calculating:

$$PC = Y \oplus c_{in} \cdot X^*$$

where $c_{in}$ is the least significant carry bit of the group, and where $X^*$ is the complement of X.

The above system can then be modified in such a way as to introduce parity bits of each of the operands to furnish the parity bits directly that are associated with their sum, without delaying the calculation to do so.

Hence the invention also has as its subject a system for calculating the parity associated with at least one group of m bits extracted from the sum of two numbers, characterized in that it includes a calculating system in accordance with the above calculating system, but to which are added supplementary EXCLUSIVE OR circuits for introducing the parities PA and PB of said numbers and disposed in such a manner as to:

either replace any one of the outputs $G_i$ of the first operator with the result of the operation $PA \oplus PB \oplus G_i$ realized with said supplementary circuits;

or replacing any two outputs $G_i$ and $G_j$ of the first operator with, respectively, the result of the operations $PA \oplus G_i$ and $PB \oplus G_j$.

Further characteristics and advantages will become apparent from the preferred embodiments described below.

BRIEF DESCRIPTION OF THE DRAWINGS

FIGS. 6 and 7 show diagrams for embodying logic modules capable of being used in the system according to the invention; and FIG. 8 shows a diagram of another logic module that can be used in the system according to the invention.

DESCRIPTION OF THE PREFERRED EMBODIMENTS

Figure 1:
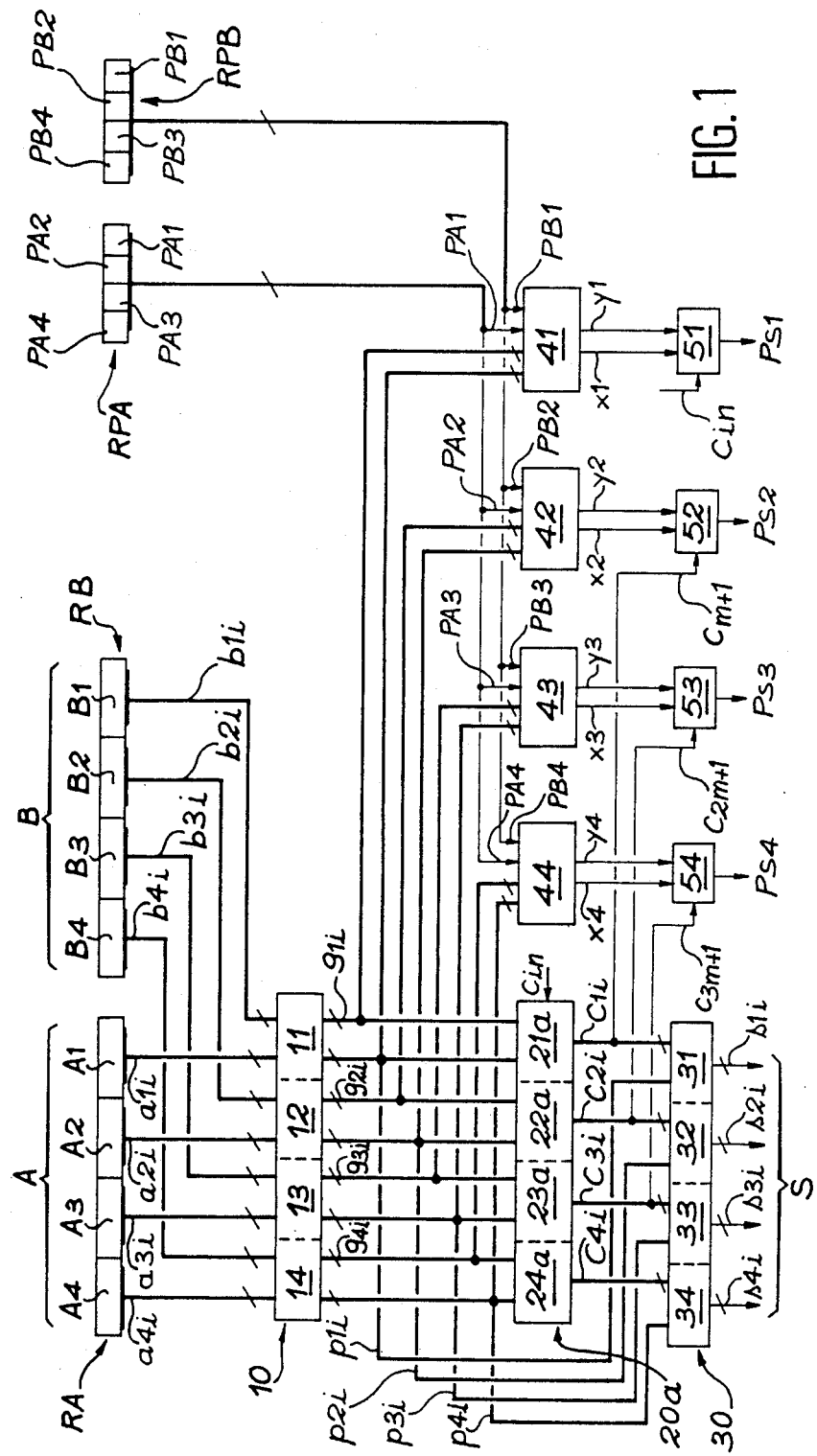
FIG. 1 is a complete diagram including an adder and a system according to the invention.

Before the invention is described with reference to the drawings, it will be useful to describe the theoretical bases of the invention.

For two numbers A and B of N bits, respectively comprising bits $a_N, a_{N-1}, \ldots, a_i, \ldots, a_2, a_1, b_N, b_{N-1}, \ldots, b_i, \ldots, b_2, b_1$, one current method for attaining the sum of these two numbers comprises using a circuit for anticipation of the carry word C formed of carry bits $c_i$ introduced in the addition.

Conventional adders of this type include a first stage that forms intermediate variables $p_i$ and $g_i$ calculated from the bits $a_i, b_i$ of the two numbers A and B according to the following equations:

$$p_i = a_i \oplus b_i$$

$$g_i = a_i \cdot b_i$$

where $\oplus$ indicates the EXCLUSIVE OR operation.

If the carry bit $c_i$ of significance i is assumed to be known, then the bit $s_i$ of significance i of the sum is obtained by the equation:

$$s_i = p_i \oplus c_i.$$

On the other hand, $c_i$ is defined as follows:

$$c_i = g_{i-1} + p_{i-1} \cdot c_{i-1}$$

Thus the carry bits may be calculated with increasing approximation based on the variables $p_i, g_i$ which depend on the single bits $a_i, b_i$ of the operands. This calculation is performed by the carry bit anticipation circuit mentioned above. The adder then includes a final stage for calculating the bits $s_i$ of the sum S obtained by the formula $$s_i = p_i \oplus c_i.$$

Turning now to the groups formed of consecutive bits extracted from the numbers A, B and C and respectively comprising the bits $a_i, b_i$ and $c_i$, where i indicates the significance in the group of the associated bit: If $c_q$ designates the least significant carry bit found in one of the groups in question, then it can be demonstrated that for i>q:

$$c_{i+1} = G_i + P_i \cdot c_q$$

where $P_i$ and $G_i$ are defined by the following recurrent formulas:

$$P_i = p_i \cdot P_{i-1}, \text{ with } P_q = p_q$$

$$G_i = g_i + p_i \cdot G_{i-1}, \text{ with } G_q = g_q$$

These last formulas make it possible to construct a carry bit anticipation circuit having a reduced number of logic circuits connected in cascade. The embodiment of this circuit will be explained with reference to FIG. 3.

Now considering the problem of the parity bits, it has been seen that the numbers are generally considered to be formed by a plurality of groups of m bits of the same size, and that one parity bit is assigned to each group.

Thus the operands A and B, the carry word C and the sum S for example respectively comprise groups A1, A2, A3, A4, B1, B2, B3, B4, C1, C2, C3, C4, S1, S2, S3, S4. One corresponding parity bit, for example $PA_j$, is assigned to each group, for example $A_j$.

In the course of the explanation, as for the parity bits, only the homolog groups of the operands, of the carry word and of the sum will be considered. That is, the groups comprising bits of the same significance. Also, to simplify keyboard input, the subscripts identifying the groups will not be used. Finally, the subscript i of a bit will be the significance relating to the group in question and hence will have a value between 1 and m, the significance 1 being the least significance in the group.

If PA, PB, PS indicate the parity bits associated respectively with the groups A, B and S, then it can easily be demonstrated that the following relation pertains:

$$PS = PA \oplus PB \oplus PC,$$

where $$PC = c_m \oplus \ldots \oplus c_i \oplus \ldots \oplus c_2 \oplus c_1$$

Thus PC is the parity bit of the group formed of the carry bits introduced at the time of the addition. Hence it is apparent that to obtain PC by the preceding formula, all the carry bits must be available.

Now theoretical calculations show that PC can be expressed in the following form:

$$PC = Y \oplus c_{in} \cdot X^*$$

where $c_{in} = c_1$, that is, is the least significant carry bit of the group and where $X^*$ is the complement of X, and:

$$Y = G_1 \oplus G_2 \oplus \ldots \oplus G_i \oplus \ldots \oplus G_{m-1}$$

$$X = P_1 \oplus P_2 \oplus \ldots + P_i \oplus \ldots \oplus P_{m-1}$$

And where $P_i$ and $G_i$ verify the following recurrent formulas:

$$P_i = p_i \cdot P_{i-1}, \text{ with } P_1 = p_1$$

$$G_i = g_i + p_i \cdot G_{i-1}, \text{ with } G_1 = g_1$$

It is understood that for the group comprising the least significant bits of the word, $c_{in} = 0$ when a normal addition is performed.

The following description relates to the us of the above formulas with which the intended object can be attained.

FIG. 1 shows an adder associated with a parity bit generator according to the invention. To illustrate the invention, it has been supposed that the numbers to be added, A and B, comprise four groups of bits, respectively A1, A2, A3, A4 and B1, B2, B3, B4. Each group is associated with a corresponding parity bit. The group A1, for example, is associated with the parity bit PA1, the group A2 is associated with the parity bit PA2, etc.

The operands A and B as well as the parity bits associated with these two operands are contained in respective registers RA, RB, RPA and RPB.

Two homolog groups extracted from the operands will now be considered, for example A1 and B1. The group A1 comprises m bits $a_{1i}$, and the group B1 comprises m bits $b_{1i}$. The bits of the same significance, $a_{1i}$ and $b_{1i}$ are combined in an operator 11 including EXCLUSIVE OR circuits and AND circuits in such a manner as to calculate the following variables:

$$p_{1i} = a_{1i} \oplus b_{1i}$$

$$g_{1i} = a_{1i} \cdot b_{1i}$$

The circuits 12, 13 and 14 associated with the other groups are identical to the circuit 11, and the set of these circuits forms the first stage 10 of the adder.

A carry bit anticipation circuit 20a receives at its input the outputs of the first stage 10. The circuit 20a, known per se, makes it possible to calculate all the carry bits $c_{1i}$, $c_{2i}$, $c_{3i}$ and $c_{4i}$ introduced into the addition of the two operands. This circuit 20a may be considered to be comprised of a plurality of circuits 21a, 22a, 23a and 24a respectively associated with the groups of which the operands are formed.

A final stage 30 comprising an EXCLUSIVE OR stage receives the carry bits of the circuit 20a and the variables $p_{1i}$–$p_{4i}$ output by the first stage 10. The circuit 30 at its output furnishes the bits $s_{1i}$–$s_{4i}$ of result S of the addition. The circuit 30 may also be considered to comprise circuits 31, 32, 33 and 34 associated respectively with the groups forming the operands. Thus the circuit 31 furnishes the bits $s_{1i}$ of the first group verifying the equation:

$$s_{1i} = p_{1i} \oplus c_{1i}.$$

The above relates solely to the adder, and the portion of the circuit comprising the parity bit generator will now be described below.

In the example shown, it has been supposed that the operands A and B and their sum S comprised four groups of m bits, and that a corresponding parity bit was assigned to each of the groups.

Thus the parity generator includes a set comprising four operators 41, 42, 43 and 44, respectively receiving the parity bits of the homolog groups of the operands and the variables output by the first stage 10.

For example, the operator 41 associated with the first group receives the parity bits PA1, PB1 and the variables $p_{1i}$ and $g_{1i}$ output by the circuit 11. As a function of these signals, the operator 41 furnishes the two variables X1 and Y1 verifying the equations that have been described above but without a subscript.

Similarly, the circuits 42, 43, 44 respectively furnish the variables X2, Y2; X3, Y3; X4, Y4.

A final stage comprising operators 51, 52, 53 and 54 receives the variables X, Y of the corresponding group as well as a carry signal depending on the group in question. More precisely, the operator 54 receives the carry bit $c_{3m+1}$ output by the circuit 23a, which is the least significant carry bit of the fourth group. The operator 53 receives the carry bit $c_{2m+1}$, which is the least significant carry bit of the third group, and the operator 52 receives the carry bit $c_{m+1}$, which is the least significant bit of the second group. In the case of a normal addition, the operator 51 receives the carry bit $c_1 = 0$.

Generally, by designating the carry bit applied to the corresponding operator as $c_{in}$, each operator furnishes an output signal PS1 . . . PS4 verifying the following:

$$PS = Y \oplus c_{in} \cdot X^*$$

The variables PS1–PS4 thus obtained are accordingly the parity bits associated with each of the groups extracted from the sum.

It is apparent that the above-described system can be generalized for any number of groups and any number of bits per group.

Stages 10 and 30 of the adder comprise standard logic circuits of the AND and EXCLUSIVE OR types. Their realization is within the competence of one skilled in the art and accordingly will not be described in detail here.

The operators 41-44 as well as the carry bit anticipation circuit 20a, on the other hand, do merit detailed description, which will now follow, referring to FIGS. 2-8.

Since the operators 41-44 are identical, only one need be described here, for example the operator 41.

Moreover, it has been seen in the introduction that the difficulty resided in the calculation of the parity bit associated with the carry bits of the group in question. Also, a system initially described above with reference to FIG. 2 makes it possible to calculate this parity bit. With reference to FIG. 3, it will now be described how this circuit can be modified to change it into a generator of a parity bit for the sum.

Figure 2:
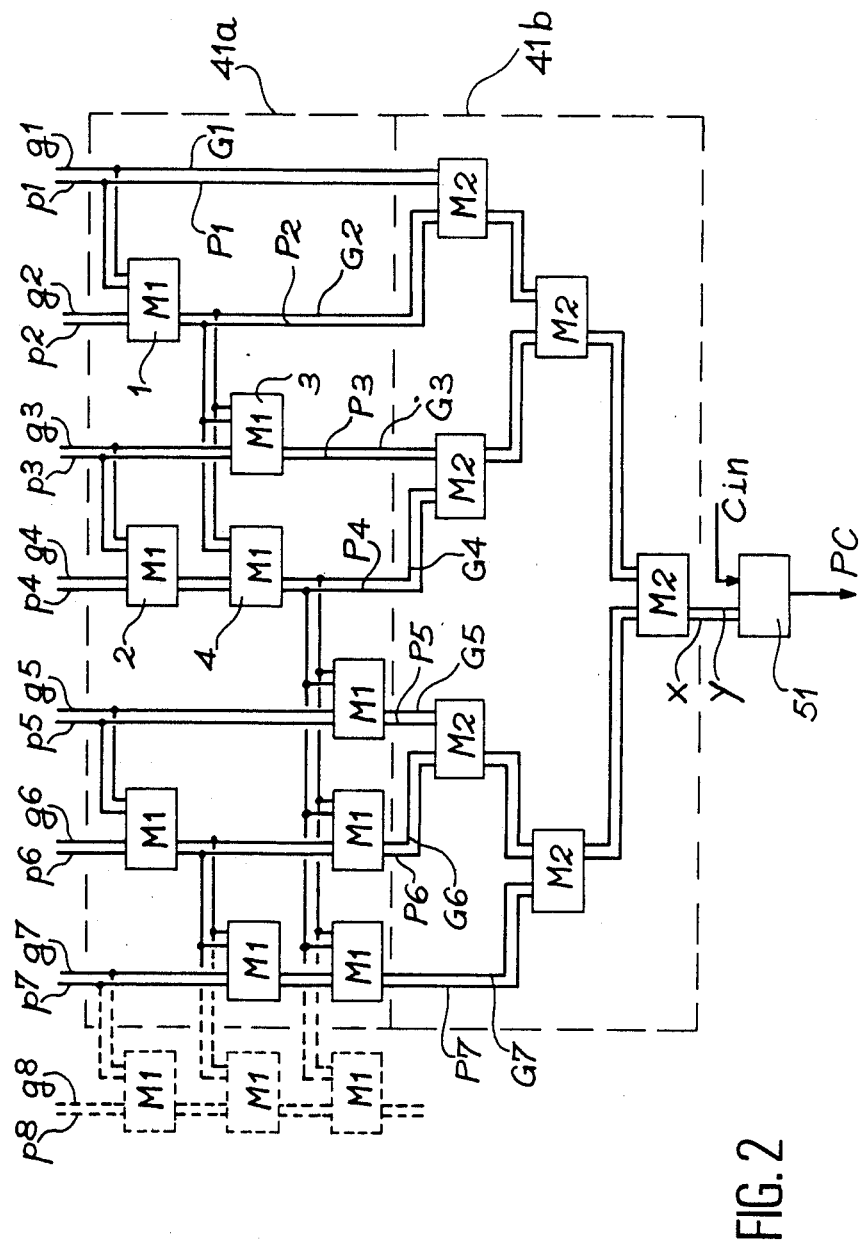
FIG. 2 shows a system for calculating the parity bit associated with a group of eight bits extracted from the carry word.
Figure 3:
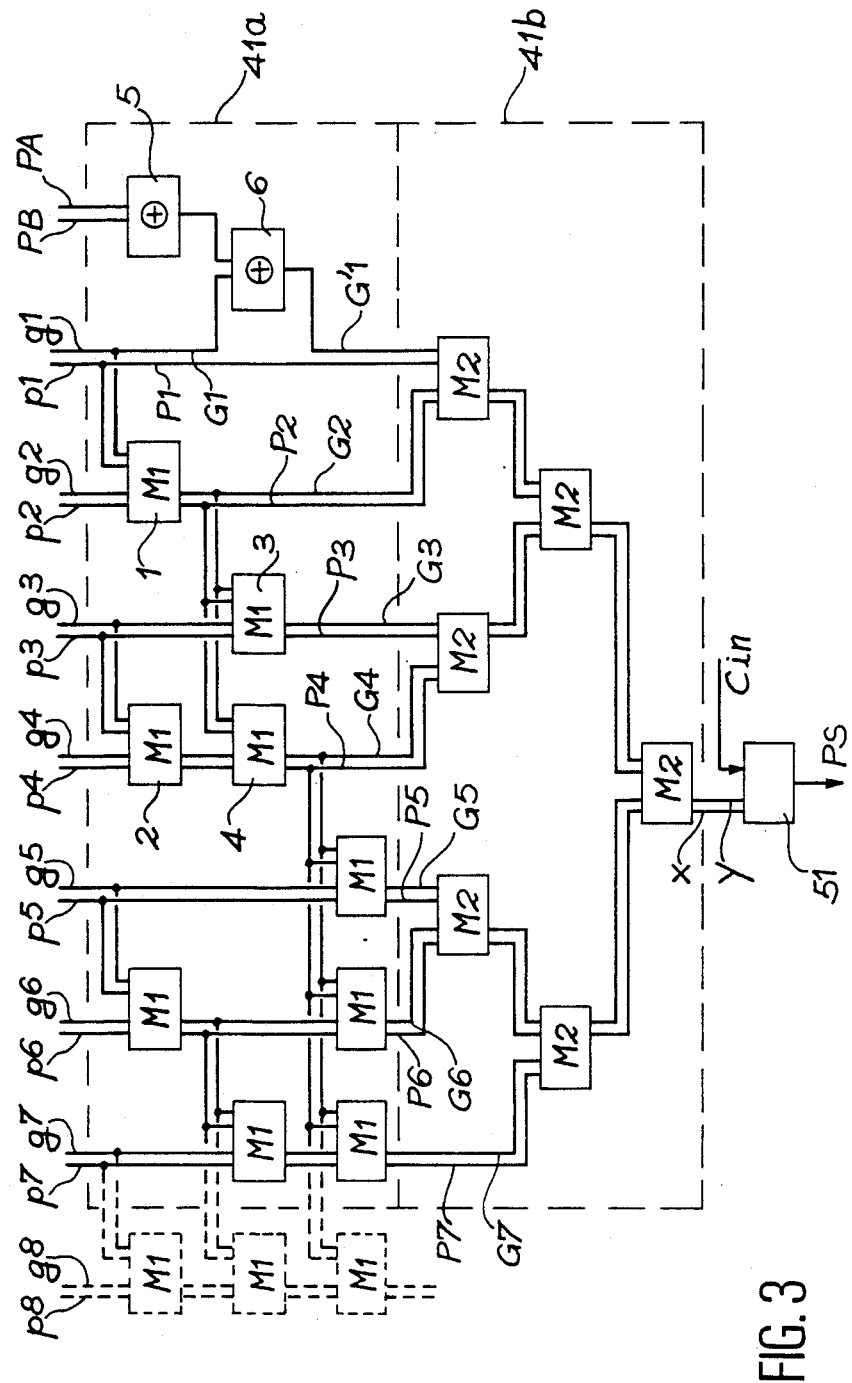
FIG. 3 shows a system for calculating the parity bit associated with a group of eight bits extracted from a sum of two binary numbers.

FIG. 2 represents a circuit that enables the calculation of the parity bit associated with the carry bits of an eight-bit group. Nevertheless, it is understood that the ensuing description is not limited to this particular case, and the description will show how the circuit can be generalized for any number of bits.

The circuit of FIG. 2 includes a first operator 41a receiving the variables $p_1, g_1$ through $p_7, g_7$ calculated by the above-described circuit 11 or by a separate but identical circuit. This circuit 11 may in fact be shared with the adder, but if a circuit with larger scale integration is desired, then it is preferable to use a circuit 11 independent of the adder, because the use of a shared circuit 11 would mask the errors that could occur in this circuit.

The operator 41a comprises solely logic modules of a first type M1, receiving at the input four binary variables $P_x, G_x, P_y, G_y$ and furnishing two binary output variables $P_z, G_x$ verifying the following equation:

$$P_z = P_y \cdot P_x$$

$$G_z = G_y + P_y \cdot G_x$$

The use of these modules and their disposition makes it possible to calculate the variables $P_i$ and $G_i$, where i is between 1 and 7, defined by the recurrence relationships as follows:

$$P_i = p_i \cdot P_{i-1}, \text{ with } P_1 = p_1$$

$$G_i = g_i + p_i \cdot G_{i-1}, \text{ with } G_1 = g_1$$

The relationship that connects the pair of output variables $P_z, G_z$ with the two pairs of input variables $P_x, G_x$ and $P_y, G_y$ has the important property of being associative. Because of this property, it is possible to dispose the modules M1 in such a manner as to calculate the variables $P_i$ and $G_i$ while effecting maximum reduction of the number of layers of this circuit, or in other words the number of these modules connected in cascade.

The manner in which the first operator 41a is constructed will now be described, proceeding by recurrence; the subscript i indicates both the significance of the bit in question and a corresponding rank of the operator.

For $i=1$, $P_1 = p_1$ and $G_1 = g_1$ are obtained directly. For i between 1 and 2, $p_1, g_1$ are also combined with $p_2, g_2$ in a first module 1, which at its output furnishes $P_2, G_2$. For $i=3$, a third module 3 combines $p_3, g_3$ with $P_2, G_2$ output by the first module 1. This module 3 furnishes $P_3, G_3$. For $i=4$, another module 2 combines $p_3, g_3$ and $p_4, g_4$ and the output of this module 2 is combined in another module 4 with the output of module 1. This module 4 furnishes $P_4, G_4$. This result is certainly attained because of the associativity of the function realized by the module M1.

To complete the construction of the operator 41a for $i>4$, the following method need merely be followed:

Once the initial assembly for i between 1 and $2^n$ has been performed, the assembly for i included between $2^n+1$ and $2^{n+1}$ is obtained by adding the modules M1 disposed in accordance with this initial assembly but offset by $2^n$ ranks toward the increased significance, thus furnishing new outputs. Then, $2^n$ supplementary modules M1 are then available, which combine the most significant outputs $P_{2^n}, G_{2^n}$ output by the initial assembly and, respectively, each of these new outputs.

It is understood that the construction will stop at the order $m-1$. All the values of the variables $P_i$ and $G_i$ will now be available. In the example in question, variables $P_i, G_i$ up to the order of 7 are now available at the output of the first operator 41a.

The outputs $P_i, G_i$ of the operator 41a are then applied to the inputs of the second operator 41b.

The operator 41b comprises logic modules of a second type M2, which are simply double EXCLUSIVE OR circuits with four inputs $X_x, Y_x, X_y, Y_y$ and furnishing two outputs $X_z, Y_z$, verifying the following:

$$X_z = X_x \oplus X_y$$

$$Y_z = Y_x \oplus Y_y$$

It can immediately be seen that it is sufficient to have these modules M2 arranged in a pyramid construction, which is equivalent to an EXCLUSIVE OR operator with multiple inputs. This assembly will then make it possible to obtain the two variables X and Y defined by the following relations:

$$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

The variables X, Y and the carry bit $c_{in}$ defined above are applied to the third operator 51, the output PC of which is connected to the inputs by the following logic equation:

$$PC = Y \oplus c_{in} \cdot X^*$$

where $c_{in}$ (here, $c_{in} = c_1$) is the least significant carry bit of the group, and where $X^*$ is the complement of X.

In practice, m is always a power of 2 and can be written as $m = 2^n$. In this case, it can easily be demonstrated that the number of layers necessary to obtain the variables $P_i, G_i$, equals n. The number of layers of circuits necessary to obtain X and Y equals 2n and consequently the total number of layers to obtain the parity bit PC equals $2n+1$. Thus in the case where $m=8$, the parity generator comprises a circuit with seven layers.

To attain a circuit capable of calculating the parity bit associated with one of the groups extracted from the sum, the above circuit must be modified so as to introduce the parity bits associated with the groups extracted from the operands.

Since the following relation pertains:

$$PS = PA \oplus PB \oplus PC.$$

where $$PC = c_m \oplus \ldots \oplus c_i \oplus \ldots \oplus c_2 \oplus c_1$$

and taking into account the commutativity and associativity of the EXCLUSIVE OR operation, it can be seen that the parity bits PA and PB need merely be introduced into the expression for Y. As for practical realization, EXCLUSIVE OR circuits may for example be used so as to replace any of the outputs $G_i$ of the first operator with the expression $PA \oplus PB \oplus G_i$. Another solution could comprise replacing any two outputs $G_i$ and $G_j$ of the first operator respectively with the result of the operations $PA \oplus G_i$ and $PB \oplus G_j$.

FIG. 3 shows an example of modification of the diagram of FIG. 2 with which this result can be obtained.

In this embodiment, the parity bits PA and PB of the groups extracted from the operands are combined in an EXCLUSIVE OR circuit 5, the output of which is combined in another EXCLUSIVE OR circuit 6 with the variable $G_1$, while the output of the second EXCLUSIVE OR circuit 6 furnishes at its output the variable $G'_1 = PA \oplus PB \oplus G_1$.

Without any other change in the circuit, the output of the operator 51 now represents the parity bit PS of the sum for the group in question.

Figure 4:
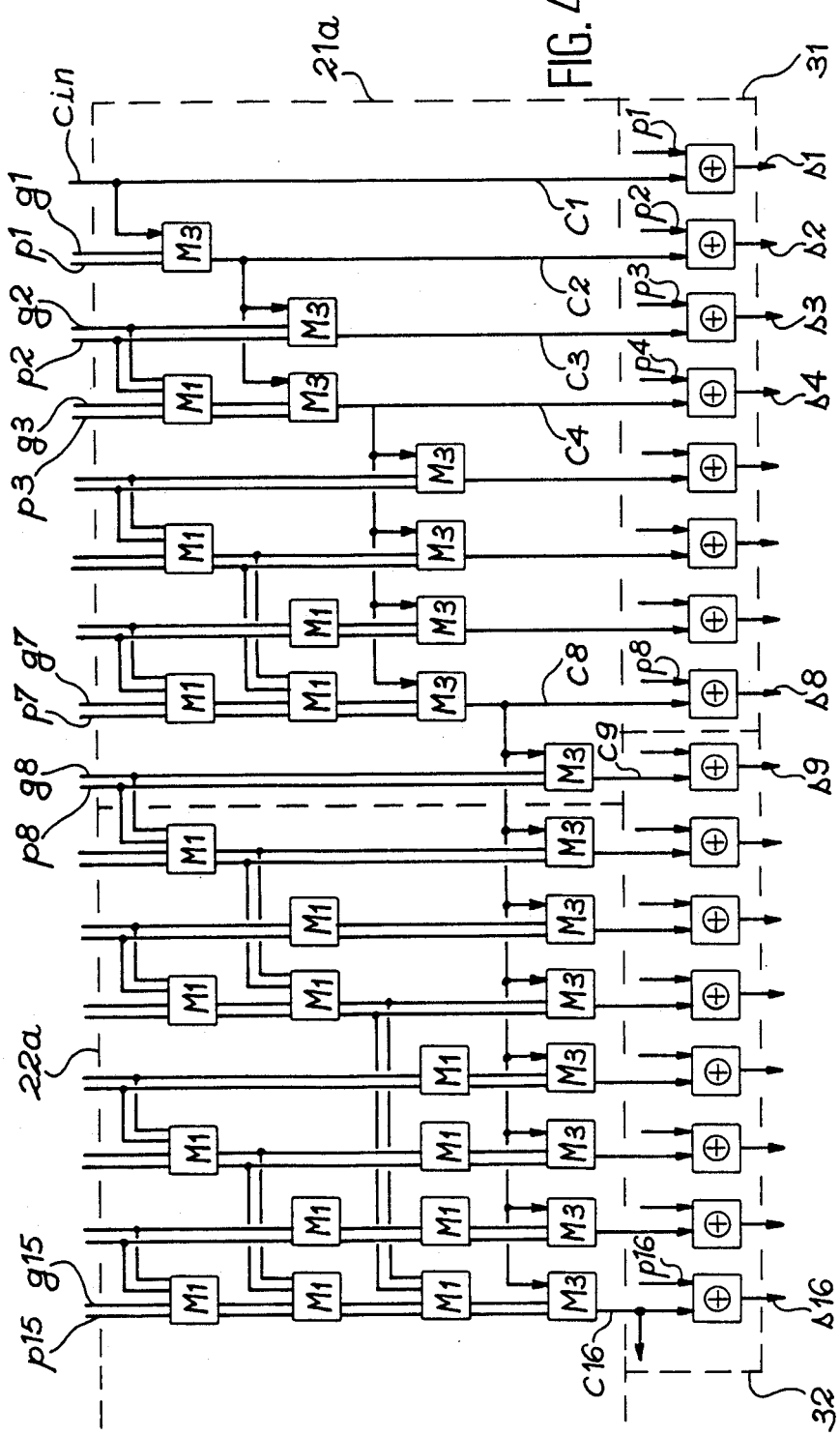
FIG. 4 shows an exemplary embodiment of an adder cooperating with the adder according to the invention.

FIG. 4 shows part of an embodiment of an adder including the anticipation circuit 20a for carry bits. Although this circuit itself is not the subject of the present invention, it will be useful to describe it, because this will enable better understanding of the context of the invention.

At its input, the anticipation circuit 21a for carry bits of the first group receives the variable $c_{in}$ and the outputs of the first stage 10.

Here, $c_{in}$ corresponds to the least significant bit $c_1$ of the carry word. For normal addition, $c_{in} = 0$.

However, the adder may also be used to perform subtraction. In effect, the subtraction operation $A - B$ recurs to calculate $A + B^* + 1$, where $B^*$ is the complement of B.

To do this, the adder can be used with A and $B^*$ as operands and with $c_{in} = 1$. Similarly, the system for calculating carry bits may be used on the condition that $c_{in} = 1$ also be introduced into the circuit 51 of the first group.

The circuit of FIG. 4 is constructed by applying the following formula:

$$c_{i+1} = G_i + P_i \cdot c_q.$$

This circuit includes a plurality of modules M1 as defined above and intended to calculate the variables $P_i$ and $G_i$. The circuit also includes modules of a third type M3 with three inputs $P_x$, $G_x$, $c_y$ and one output $c_z$ verifying the following relationship:

$$c_z = G_x + P_x \cdot c_y.$$

The modules of the type M1 and M3 are disposed in an assembly known as a "recurrence solver" known in adder technology.

This circuit at its output furnishes the carry bits $c_i$ which are then combined in the circuit 31 with the variables $p_i$ of the same significance.

The circuit 31 furnishes the bits $s_i$ of the result of addition.

The adder also includes the circuit 22a and 32 for the second group, and other circuit not shown, for the following groups.

Thus the carry bits introduced into the parity bit generators described with respect to FIGS. 2 and 3 may be extracted from this carry bit anticipation circuit belonging to the adder. However, by proceeding in this way, the errors bearing on the carry bits used in the parity bit generator would be masked completely. For this reason, it is preferable to provide an independent circuit to calculate these parity bits.

Such a circuit may be identical to that used in the adder, but it is important to simplify it so that it furnishes only the carry bits introduced in the generation of the parity bit.

Figure 5:
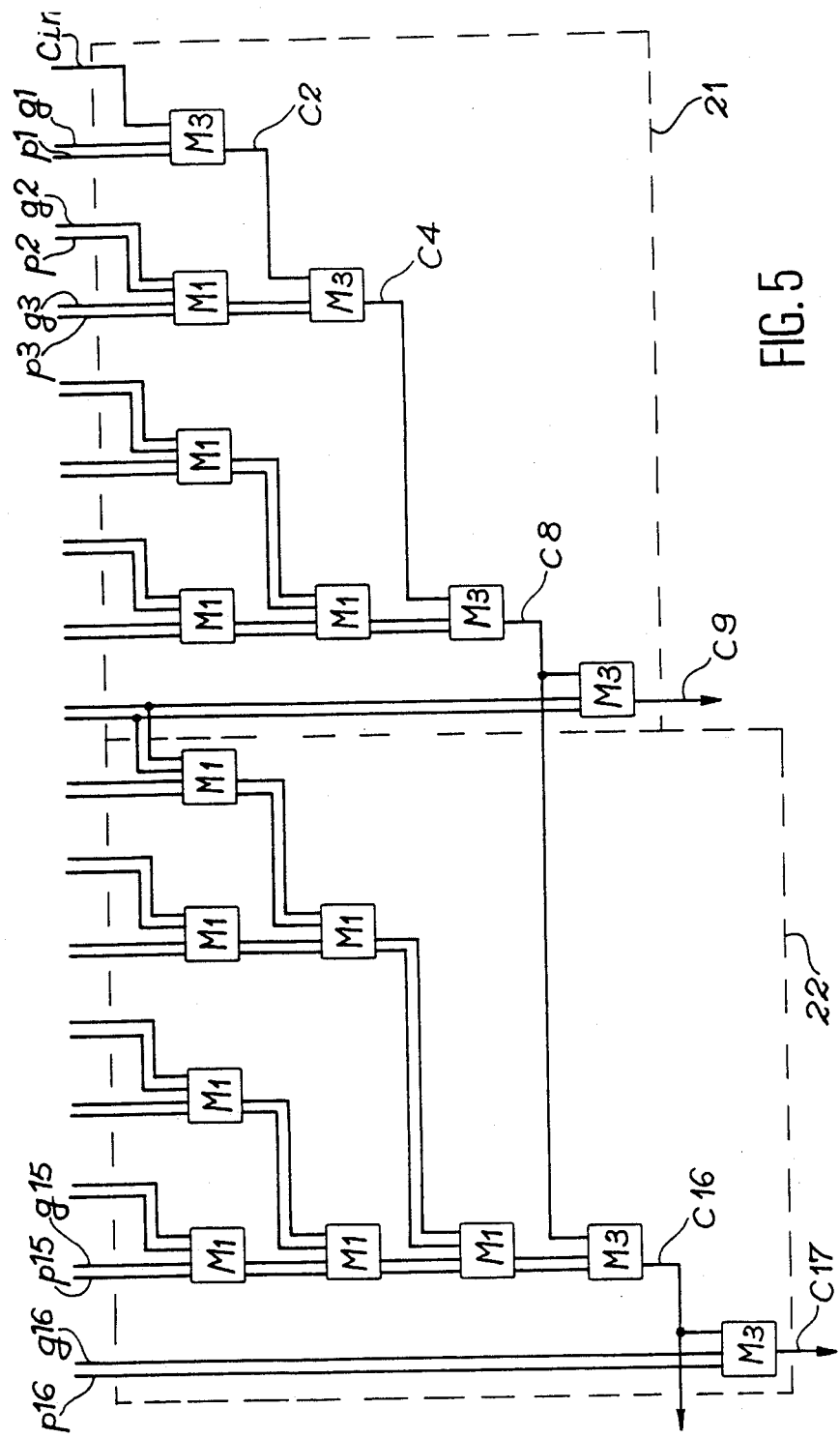
FIG. 5 shows an anticipation circuit for carry bits in a particular embodiment of the invention.

FIG. 5 shows such a carry bit anticipation circuit specific to the parity bit generator. This circuit represents the case where the groups to which the parity bits pertain include eight bits. A first subset 21 furnishes the carry bits $c_9$ which will serve as an input signal for the circuit 52 of the second group. The circuit 22 furnishes the carry bit $c_{17}$ serving as the input to the circuit 53 of the third group. Finally, the circuit 23, not shown, will furnish the carry bit $c_{25}$ for the fourth group.

It will be understood that the adaptation of this circuit in the case where the groups are of any number and length is within the competence of one skilled in the art.

It is important to note that if the numbers to be added include N bits, where N is a power of two, and hence $N = 2^r$, then the carry bit anticipation circuit will include r layers. As a result, the adder will include a total of $r + 1$ layers. This result should be close to the $2n + 1$ layers necessary to attain the parity bit generator. Hence it is suitable to select n as a function of r.

If for example, $N = 64$ and $m = 8$, then precisely the same number of layers is obtained for the adder and for the parity bit generator. However, this would not mean that the two circuits are precisely equally fast. In fact, the logic modules introduced into the adder and parity bit generator are not identical. In particular, at the level of the final layer, the operator 51 performs a more complex operation than the EXCLUSIVE OR operations of the final layer 31 of the adder. As a result, if the parity bit generator uses the carry bits originating in the adder, then the parity bits could be obtained slightly later than the result of addition. However, if a parity bit generator independent of the circuits of the adder is used, this handicap is overcome. In fact, by comparing the circuits shown in FIGS. 4 and 5, it can for example be seen that one of the modules M3 of the next-to-last stage of the circuit 21a supplies a plurality of modules M3, while in the circuit of FIG. 5, this is not the case. As a result there is a difference in the input capacities of this stage, and as a consequence the circuit of FIG. 5 will be faster than that of FIG. 4. Thus the relative complexity of the parity bit generator is largely compensated for by the simplification of the carry bit anticipation circuit.

Some description will now be provided with a view to the embodiment of the parity bit generator of the invention by CMOS technology.

We have seen that the M1 modules perform the following functions:

$$P_z = P_y \cdot P_x$$

$$G_z = G_y + P_y \cdot G_x$$

However, with CMOS technology, it is easier to obtain the complementary functions and their dual function.

FIG. 6 shows a CMOS circuit making it possible to obtain the variable $G_z^*$, which is the complement of $G_z$. This circuit may then be associated with a NAND gate furnishing $P_z^*$, which is the complement of $P_z$.

FIG. 7 shows a circuit with which the dual function of the above can be obtained. Thus, since $G_x^*$, $G_y^*$, $P_y^*$ are the complements of $G_x$, $G_y$, $P_y$, respectively, the circuit of FIG. 7 furnishes G verifying the following equation:

$$G_z = G_y + P_y \cdot G_x$$

The circuit of FIG. 7 can be associated with a NOR gate. Consequently, the circuits of FIGS. 2 and 3 could be embodied by using, instead of the above-defined modules M1, these circuits without changing the final result, on the condition that inverters be provided at the appropriate inputs.

The circuits may also be used to embody the modules M3 of the carry bit anticipation circuit.

It will be unnecessary to describe the method for assembling these circuits in further detail, because it is well known to one skilled in the art.

FIG. 8, by way of illustration, shows a CMOS circuit for attaining the EXCLUSIVE OR function. This circuit could be used to embody the modules M2 and 51 of FIGS. 2 and 3, for example.

What is claimed is:

1. A system for calculating the parity bit (PC associated with at least one group of m consecutive bits extracted from the carry word (C) appearing at the time of the addition of two binary numbers (A, B), said numbers each including at least one group of m bits, the groups belonging respectively to said numbers (A, B) and to the carry word (C) comprising respective bits of the same significance, said groups extracted from said numbers (A, B) being formed respectively by bits $a_m, \ldots, a_i, \ldots, a_2, a_1$ and bits $b_m, \ldots, b_i, \ldots, b_2, b_1$, where the subscript i indicates the significance in the group of the associated bit ($a_i$, $b_i$), said system being characterized in that it comprises:

first means (11) for calculating, for every i included between 1 and m−1, the values:

$$P_i = a_i \oplus b_i$$

pi $g_i = a_i \cdot b_i$ where $\oplus$ indicates the EXCLUSIVE OR operation.

first operator means (41a) for calculating, for every i included between 1 and m−1, the values $P_i$ and the values $G_i$ verifying the following recurring logical equations:

$$P_i = p_i \cdot p_{i-1}, \text{ with } P_1 = p_1$$

$$G_i = g_i + p_i \cdot G_{i-1}, \text{ with } G_1 = g_1$$

second operator means (41b) for calculating the values Y and X, where $$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

and third operator means (51) for calculating the value PC where $$PC = Y \oplus c_{in} \cdot X^*$$

where $c_{in}$ is the least significant carry bit of the group, and where $X^*$ is the complement of X.

2. A system for calculating the parity bit (PS) associated with at least one group of m bits extracted from the sum (S) of two binary numbers (A, B), characterized in that it comprises a calculating system as defined by claim 1 and further including supplementary EXCLUSIVE OR circuit means (5, 6) for introducing the parity bits PA and PB of said groups extracted from said numbers (A, B) and disposed in such a manner as to:

either replace any one of the outputs $G_i$ of the first operator (41a) with the result of the operation $PA \oplus PB \oplus G_i$ performed with the aid of said supplementary circuits (5, 6);

or to replace any two outputs $G_i$ and $G_j$ of the first operator (41a) with the result of the operations $PA \oplus G_i$ and $PB \oplus G_j$, respectively.

3. A system as defined by claim 1 characterized in that said first operator means (41a) comprises logic modules of a first type (M1) operating upon four inputs ($P_x$, $G_x$, $P_y$, $G_y$) and furnishing two output values ($P_z$, $G_z$) according to the following equations:

$$P_z = P_y \cdot P_x$$

$$G_z = G_y + P_y \cdot G_x$$

said logic modules being constructed and arranged in accordance with the following recurrent method, where the significance (i) indicates a corresponding rank of the operator:

(a) for i included between 1 and 2, a first module (1) operates upon $p_1$, $g_1$ and $p_2$ and $g_2$ and furnishes $P_2$, $G_2$;

(b) for i included between 3 and 4, a second module (2) operates upon $p_3$, $g_3$ and $p_4$, $g_4$, a third module (3), operates upon $P_2$, $G_2$ and $p_3$, $g_3$ and furnishes $P_3$, $G_3$, a fourth module (4) operates upon $P_2$, $G_2$ and the outputs of the second module (2) and furnishes $P_4$, $G_4$;

(c) once the initial assembly for i included between 1 and $2^n$ has been performed, the assembly for i included between $2^n + 1$ and $2^{n+1}$ is obtained by adding the modules (M1) disposed in accordance with said initial assembly but offset by $2^n$ ranks toward the major significance, thus furnishing new outputs, $2^n$ supplementary modules of the first type (M1) being disposed to operate upon the most significant outputs ($P_{2n}$, $G_{2n}$) output by said initial assembly and, respectively, each of said new outputs.

4. A system for calculating the parity bit (PS) associated with at least one group of m bits extracted from the sum (S) of two binary numbers (A, B), characterized in that it comprises a calculating system as defined by claim 3 and further including supplementary EXCLUSIVE OR circuit means (5, 6) for introducing the parity bits PA and PB of said groups extracted from said numbers (A, B) and disposed in such a manner as to:

either replace any one of the outputs $G_i$ of the first operator (41a) with the result of the operation $PA \oplus PB \oplus G_i$ performed with the aid of said supplementary circuits (5, 6);

or to replace any two outputs $G_i$ and $G_j$ of the first operator (41a) with the result of the operations $PA \oplus G_i$ and $PB \oplus G_j$, respectively.

5. A system as defined by claim 3, characterized in that said second operator means (41b) comprises logic modules of a second type (M2) with four inputs $X_x$, $Y_x$, $X_y$, $Y_y$ and furnishing two outputs $X_z$, $Y_z$, according to the following equations:

$$X_z = X_x \oplus X_y$$

$$Y_z = Y_x \oplus Y_y$$

said logic modules of the second type (M2) being disposed in a pyramid, the base of which at its input receives the outputs $P_i$, $G_i$ of the first operator means (41, 42, 43, 44) taken two by two as much as possible, and disposed in such a manner as to calculate the following:

$$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

6. A system for calculating the parity bit (PS) associated with at least one group of m bits extracted from the sum (S) of two binary numbers (A, B), characterized in that it comprises a calculating system as defined by claim 5 and further including supplementary EXCLUSIVE OR circuit means (5, 6) for introducing the parity bits PA and PB of said group extracted from said numbers (A, B) and disposed in such a manner as to:
   either replace any one of the outputs $G_i$ of the first operator (41a) with the result of the operation $PA \oplus PB \oplus G_i$ performed with the aid of said supplementary circuits (5, 6);
   or to replace any two outputs $G_i$ and $G_j$ of the first operator (41a) with the result of the operations $PA \oplus G_i$ and $PB \oplus G_j$, respectively.

7. A system as defined by claim 6, characterized in that said supplementary EXCLUSIVE OR circuit means (5, 6) are disposed in such a manner that the maximum number of modules of the first type (M1) and of the EXCLUSIVE OR type connected in cascade are not increased by the insertion of said supplementary EXCLUSIVE OR circuits (5, 6).

8. A system as defined by claim 1, it includes an adder circuit (10, 20a, 30) operatively associated with said system and characterized in that the carry bit ($c_{in}$) is calculated by a separate circuit.

9. A system for calculating the parity bit (PS) associated with at least one group of m bits extracted from the sum (S) of two binary numbers (A, B), characterized in that it comprises a calculating system as defined by claim 8 and further including supplementary EXCLUSIVE OR circuit means (5, 6) for introducing the parity bits PA and PB of said groups extracted from said numbers (A, B) and disposed in such a manner as to:
   either replace any one of the outputs $G_i$ of the first operator (41a) with the result of the operation $PA \oplus PB \oplus G_i$ performed with the aid of said supplementary circuits (5, 6);
   or to replace any two outputs $G_i$ and $G_j$ of the first operator (41a) with the result of the operations $PA \oplus G_i$ and $PB \oplus G_j$, respectively.

10. A system as defined by claim 2 characterized in that said first operator means (41a) comprises logic modules of a first type (M1) operating upon four inputs ($P_x$, $G_x$, $P_y$, $G_y$) and furnishing two output values ($P_z$, $G_z$) according to the following equations $$P_z = P_y \cdot P_x$$

$$G_z = G_y + P_y \cdot G_x$$

said logic modules being constructed and arranged in accordance with the following recurrent method, where the significance (i) indicates a corresponding rank of the operator:

(a) for i included between 1 and 2, a first module (1) operates upon $p_1$, $g_1$ and $p_2$ and $g_2$ and furnishes $P_2$, $G_2$;

(b) for i included between 3 and 4, a second module (2) operates upon $P_3$, $G_3$ and $p_4$, $g_4$, a third module (2) operates upon $P_3 G_3$ and $P_4, G_4$, a third module (3) operates upon $P_2$, $G_2$ and $p_3$, $g_3$ and furnishes $P_3$, $G_3$, a fourth module (4) operates upon $P_2$, $G_2$ and the outputs of the second module (2) and furnishes $P_4$, $G_4$;

(c) once the initial assembly for i included between 1 and $2^n$ has been performed, the assembly for i included between $2^n + 1$ and $2^{n+1}$ is obtained by adding the modules (M1) disposed in accordance with said initial assembly but offset by $2^n$ ranks toward the major significance, thus furnishing new outputs, $2^n$ supplementary modules of the first type (M1) being disposed to operate upon the most significant outputs ($P_{2n}$, $G_{2n}$) output by said initial assembly and, respectively, each of said new outputs.

11. A system for calculating the parity bit (PS) associated with at least one group of m bits extracted from the sum (S) of two binary numbers (A, B), characterized in that it comprises a calculating system as defined by claim 10 and further including supplementary EXCLUSIVE OR circuit means (5, 6) for introducing the parity bits PA and PB of said groups extracted from said numbers (A, B) and disposed in such a manner as to:
   either replace any one of the outputs $G_i$ of the first operator (41a) with the result of the operation $PA \oplus PB \oplus G_i$ performed with the aid of said supplementary circuits (5, 6);
   or to replace any two outputs $G_i$ and $G_j$ of the first operator (41a) with the result of the operations $PA \oplus G_i$ and $PB \oplus G_j$, respectively.

12. A system as defined by claim 10, characterized in that said second operator means (41b) comprises logic modules of a second type (M2) with four inputs $X_x$, $Y_x$, $X_y$, $Y_y$ and furnishing two outputs $X_z$, $Y_z$, according to the following equations:

$$X_z = X_x \oplus X_y$$

$$Y_z = Y_x \oplus Y_y$$

said logic modules of the second type (M2) being disposed in a pyramid, the base of which at its input receives the outputs $P_i$, $G_i$ of the first operator means (41, 42, 43, 44) taken two by two as much as possible, and disposed in such a manner as to calculate the following:

$$Y = G_1 \oplus G_2 \oplus \ldots \oplus G_i \oplus \ldots \oplus G_{m-1}$$

$$X = P_1 \oplus P_2 \oplus \ldots \oplus P_i \oplus \ldots \oplus P_{m-1}$$

13. A system for calculating the parity bit (PS) associated with at least one group of m bits extracted from the sum (S) of two binary numbers (A, B), characterized in that it comprises a calculating system as defined by claim 12 and further including supplementary EXCLUSIVE OR circuit means (5, 6) for introducing the parity bits PA and PB of said groups extracted from said numbers (A, B) and disposed in such a manner as to:
  either replace any one of the outputs $G_i$ of the first operator (41a) with the result of the operation PA⊕PB⊕$G_i$ performed with the aid of said supplementary circuits (5, 6);
  or to replace any two outputs $G_i$ and $G_j$ of the first operator (41a) with the result of the operations PA⊕$G_i$ and PB⊕$G_j$, respectively.

14. A system as defined by claim 13, characterized in that said supplementary EXCLUSIVE OR circuit means (5, 6) are disposed in such a manner that the maximum number of modules of the first type (M1) and of the EXCLUSIVE OR type connected in cascade are not increased by the insertion of said supplementary EXCLUSIVE OR circuits (5, 6).

15. A system as defined by claim 8 characterized in that the first means (10) is shared with the adder (10, 20a, 30) associated with said system.

16. A system for calculating the parity bit (PS) associated with at least one group of m bits extracted from the sum (S) of two binary numbers (A, B), characterized in that it comprises a calculating system as defined by claim 15 and further including supplementary EXCLUSIVE OR circuit means (5, 6) for introducing the parity bits PA and PB of said groups extracted from said numbers (A, B) and disposed in such a manner as to:
  either replace any one of the outputs $G_i$ of the first operator (41a) with the result of the operation PA⊕PB⊕$G_i$ performed with the aid of said supplementary circuits (5, 6);
  or to replace any two outputs $G_i$ and $G_j$ of the first operator (41a) with the result of the operations PA⊕$G_i$ and PB⊕$G_j$, respectively.

17. A system as defined by claim 15 characterized in that said first operator means (41a) comprises logic modules of a first type (M1) operating upon four inputs ($P_x$, $G_x$, $P_y$, $G_y$) and furnishing two output values ($P_z$, $G_z$) according to the following equations:

$P_z = P_y \cdot P_x$ $G_z = G_y + P_y \cdot G_x$ said logic modules being constructed and arranged in accordance with the following recurrent method, where the significance (i) indicates a corresponding rank of the operator:
  (a) for i included between 1 and 2, a first module (1) operates upon $p_1$, $g_1$ and $p_2$ and $g_2$ and furnishes $P_2$, $G_2$;
  (b) for i included between 3 and 4, a second module (3) operates upon $P_2$, $G_2$ and $p_3$, $g_3$ and furnishes $P_3$, $G_3$, a fourth module (4) operates upon $P_2$, G and the outputs of the second module (2) and furnishes $P_4$, $G_4$;
  (c) once the initial assembly for i included between 1 and $2^n$ has been performed, the assembly for i included between $2^n+1$ and $2^{n+1}$ is obtained by adding the modules (M1) disposed in accordance with said initial assembly but offset by $2^n$ ranks toward the major significance, thus furnishing new outputs, $2^n$ supplementary modules of the first type (M1) being disposed to operate upon the most significant outputs ($P_{2n}$, $G_{2n}$) output by said initial assembly and, respectively, each of said new outputs.

18. A system for calculating the parity bit (PS) associated with at least one group of m bits extracted from the sum (S) of two binary numbers (A, B), characterized in that it comprises a calculating system as defined by claim 17 and further including supplementary EXCLUSIVE OR circuit means (5, 6) for introducing the parity bits PA and PB of said groups extracted from said numbers (A, B) and disposed in such a manner as to:
  either replace any one of the outputs $G_i$ of the first operator (41a) with the result of the operation PA⊕PB⊕$G_i$ performed with the aid of said supplementary circuits (5, 6);
  or to replace any two outputs $G_i$ and $G_j$ of the first operator (41a) with the result of the operations PA⊕$G_i$ and PB⊕$G_j$, respectively.

19. A system as defined by claim 17, characterized in that said second operator means (41b) comprises logic modules of a second type (M2) with four inputs $X_x$, $Y_x$, $X_y$, $Y_y$ and furnishing two outputs $X_z$, $Y_z$, according to the following equations:

$X_z = X_x \oplus X_y$ $Y_z = Y_x \oplus Y_y$ said logic modules of the second type (M2) being disposed in a pyramid, the base of which at its input receives the outputs $P_i$, $G_i$ of the first operator means (41, 42, 43, 44) taken two by two as much as possible, and disposed in such a manner as to calculate the following:

$Y = G_1 \oplus G_2 \oplus \ldots \oplus G_i \oplus \ldots \oplus G_{m-1}$ $X = P_1 \oplus P_2 \oplus \ldots \oplus P_i \oplus \ldots \oplus P_{m-1}$ 20. A system for calculating the parity bit (PS) associated with at least one group of m bits extracted from the sum (S) of two binary numbers (A, B), characterized in that it comprises a calculating system as defined by claim 19 and further including supplementary EXCLUSIVE OR circuit means (5, 6) for introducing the parity bits PA and PB of said groups extracted from said numbers (A, B) and disposed in such a manner as to:
  either replace any one of the outputs $G_i$ of the first operator (41a) with the result of the operation PA⊕PB⊕$G_i$ performed with the aid of said supplementary circuits (5, 6);
  or to replace any two outputs $G_i$ and $G_j$ of the first operator (41a) with the result of the operations PA⊕$G_i$ and PB⊕$G_j$, respectively.

21. A system as defined by claim 20, characterized in that said supplementary EXCLUSIVE OR circuit means (5, 6) are disposed in such a manner that the maximum number of modules of the first type (M1) and of the EXCLUSIVE OR type connected in cascade are not increased by the insertion of said supplementary EXCLUSIVE OR circuits (5, 6).

* * * * *

UNITED STATES PATENT AND TRADEMARK OFFICE
CERTIFICATE OF CORRECTION

PATENT NO. : 4,958,353
DATED : September 18, 1990
INVENTOR(S) : Greiner et al

It is certified that error appears in the above-identified patent and that said Letters Patent is hereby corrected as shown below:

Col. 11, claim 1, line 32, "(PC" should be -- (PC) --.

Col. 11, claim 1, line 50 in equation "pi gi = ai·bi" should be -- gi = ai·bi --, (delete pi).

Signed and Sealed this

Sixteenth Day of June, 1992

Attest:

DOUGLAS B. COMER

Attesting Officer   Acting Commissioner of Patents and Trademarks